United States Patent [19]

Takahashi et al.

[11] Patent Number: 4,734,726
[45] Date of Patent: Mar. 29, 1988

[54] APPARATUS FOR MOVING A LENS

[75] Inventors: Akira Takahashi, Kawasaki; Saburo Sasaki, Tokyo; Koichi Nishi, Yokohama; Shinichiro Koshiishi, Hachioji, all of Japan

[73] Assignee: Ricoh Company, Ltd., Tokyo, Japan

[21] Appl. No.: 38,980

[22] Filed: Apr. 16, 1987

[30] Foreign Application Priority Data

Apr. 21, 1986 [JP] Japan .................. 61-58822[U]

[51] Int. Cl.⁴ .................................................. G03B 3/10
[52] U.S. Cl. .................................................. 354/195.1
[58] Field of Search .............................. 354/195.1, 400

[56] References Cited

U.S. PATENT DOCUMENTS

4,601,563 7/1986 Miyawaki et al. .............. 354/195.1
4,639,111 1/1987 Harvey ....................... 354/195.1 X Primary Examiner—Michael L. Gellner
Attorney, Agent, or Firm—Oblon, Fisher, Spivak, McClelland & Maier

[57] ABSTRACT

An apparatus for moving a lens between first and second positions, comprising; a support member means for supporting said lens, an electric motor connected to said support member means for moving said support member, a control circuit means connected to said motor for supplying a first current to said motor to move said support member means from said first position to said second position and vice versa and a second current to said motor to hold said support member means at least one of said first position and second position, said second current being smaller than said first current.

1 Claim, 14 Drawing Figures

APPARATUS FOR MOVING A LENS

This invention relates to an apparatus for a lens support member and more particularly to an apparatus which electrically drives a support member for a lens to a first and a second setting positions.

Generally, a camera is known which includes a device for electrically driving a support member for a lens to a first and a second set positions. Among cameras of this kind, there are a camera of the type which, for example, switches a lens to a longer focus side (telephoto side) and a shorter forcus side (wide angle side), and the so-called sink-into-body camera which switches a lens so that the lens is housed at a recessed position on the front of the camera body when the camera is carried (while not in use) and that the lens is set in use to a position extruding from the front of the camera body.

However, a conventional electric drive apparatus for a support member of a lens employs a spring having a strong resiliency and a gear to ensure that the support member is held at a predetermined set position, so that a large motor torque is required to push the support member. Thus a large-sized motor is required and power consumption is increased.

After the motor is rotated and the support member is set to a predetermined position, an external force may be exerted on the support member. In that case, a mechanical position hold means is used to prevent a reverse rotation of the motor. This renders the structure complex and troublesome to adjust, which invites increased cost.

This invention has been made by contemplating these problems. The object of this invention is to provide an electric drive apparatus for a lens support member which ensures that the support member is held at a set position without complicating the structure of the apparatus and increasing the cost. The object is achieved by an apparatus for moving a lens between first and second positions, comprising; a support member means for supporting said lens, an electric motor connected to said support member means for moving said support member, a control circuit means connected to said motor for suppling a first current to said motor to move said support member means from said first position to second position and vice versa and a second current to said motor to hold said support member means at least one of said first position and second position, said second current being smaller than said first current.

As described above, an electric drive apparatus for a lens support member according to this invention includes a simple structure for supplying a weak current to the motor to hold the lens support member at the set position without using a complex mechanism to thereby absorb play among the components without using any special high-precision components.

This apparatus does not need special mechanical parts, so that it reduces the manufacturing cost greatly.

An electric drive apparatus of this invention will be described by referring to FIGS. 1 through 14.

Figure 13:
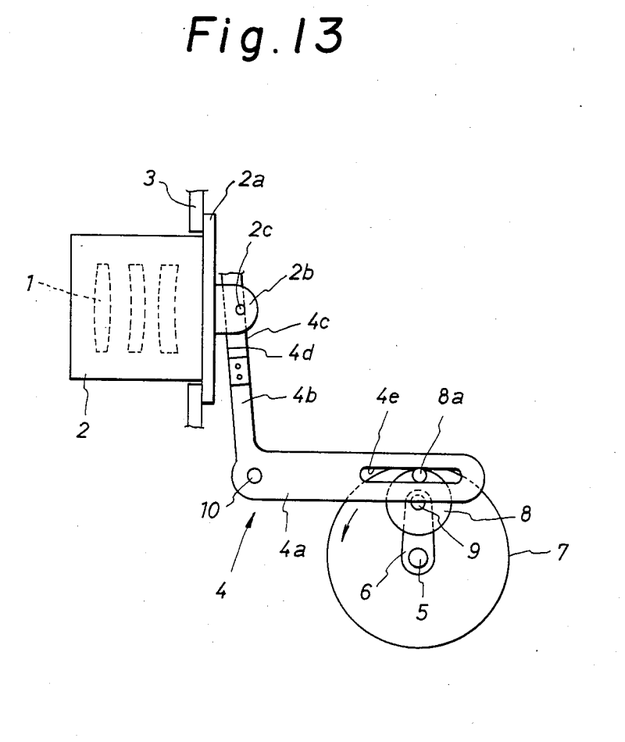
FIG. 13 is a rough schematic of one example of a conventional apparatus.

A conventional electric drive apparatus for a lens support member will now be described using FIGS. 13 and 14. A sink-into-body camera will be taken as an example. As shown in FIG. 13, a cylindrical support member 2, which supports a lens group 1 which includes a plurality of lenses, is provided retractably relative to the camera body. Support member 2 has at its inner end a flange 2a which can abut on a stop 3 provided on the camera body.

Provided on the back of flange 2a is an arm 2b which has a driven pin 2c substantially at its center.

A drive arm 4 is provided rotatable around a pivot 10 fixed to a stationary structure. Arm portion 4a of drive arm 4 has an elongated guide slot 4e extending along its axis at one end thereof. A drive pin 8a is inserted in guide slot 4e. When pin 8a is turned around a rotating shaft 5, drive arm 4 is turned around pivot 10. Two leaf springs 4c and 4d are fixed at their bases to the end of the other arm portion 4b of drive arm 4 and adapted to loosely receive the driven pin 2c therebetween.

Fixed to the camera body is an internal gear 7 with which a smaller planetary gear 8 meshes. Gear 8 is supported rotatable around a pivot 9 provided at one end of arm 6 which is supported at the other end by rotating shaft 5. The drive pin 8a is provided at a position remote from the center of planetary gear 8.

For example, in order to set support member 2 from its housed position to its operating position (the position shown in FIG. 13), a motor (not shown) applies a torque to shaft 5. This causes arm 6 to rotate, for example, clockwise, which in turn causes planetary gear 8 to move clockwise around shaft 5 and move counterclockwise around pivot 9. This causes drive pin 8a to deviate upwardly to move guide slot 4e upwardly. By this action, drive arm 4 is turned counterclockwise around pivot 10 to cause leaf spring 4c to push the driven pin 2c, thereby moving support member 2 in the direction in which support member 2 extrudes from the front of the camera body. This movement continues until support member flange 2a abuts on stop 3. Further rotation of shaft 5 causes the driven pin 2c to be maintained biased by leaf spring 4c to stop power supply to the motor. At this time, it is arranged that the center of drive pin 8a, the center of pivot 9 and the rotating shaft 5 align with the dead center of the drive mechanism therefor.

Therefore, although support member 2 is pressed by an external force, it is only pressed against the action of leaf spring 4c. Thus by releasing the external force, support member 2 is returned to the position where support flange 2a abuts on stop 3.

Since this conventional apparatus uses leaf spring 4c having a strong spring force to ensure that support member 2 is held at the predetermined set position, however, a large motor torque is required to perform the push operation by srping 4c. It requires a large-sized motor and hence increases power consumption.

In order to ensure that support member 2 is held at the set position, the dead center in the planetary gear mechanism must be set accurately. Therefore, the respective components of the mechanism must be ones machined with high precision so as not to contain the so-called play, which increases the machining and assembling cost.

Figure 14:
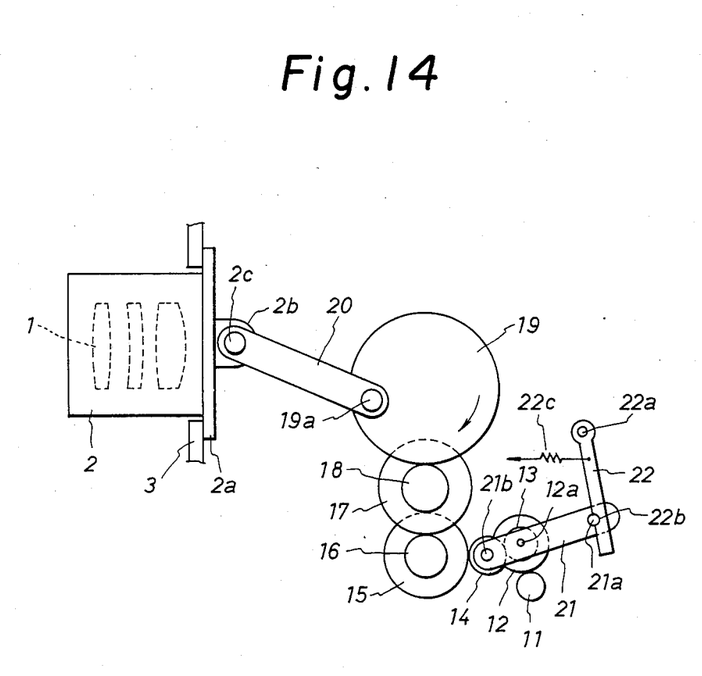
FIG. 14 is similarly a rough schematic of another conventional example.

Another example of a conventional electric drive apparatus for a lens support member is shown in FIG. 14.

A gear 12, meshing with an output gear 11 of a motor (not shown), is provided rotatable around a pivot 12a fixed to the camera body with a smaller diameter gear 13 fixed to gear 12. Mounted rotatable around a pivot 12a is a lever 21 which has at one end a stop pin 21a fixed thereto and at the other end a pivot 21b fixed thereto on which is rotatably supported a smaller diameter gear 14 meshing with gear 13. Gear 14 is meshed with a large diameter drive gear 19 via a series of reduction gears 15, 16, 17, 18. Gear 19 has a drive pin 19a near its edge on one surface thereof. Pin 19a and drive pin 2c are linked by a drive arm 20.

A stop arm 22 is rotatably supported at one end by a pivot 22a and has at the other end portion a click 22b engageable with the stop pin 2a. Stop arm 22 is biased by a tension spring 22c clockwise around pivot 22a.

Therefore, when output gear 11 is rotated by the motor, the torque is transmitted sequentially through gears 12-18 to drive the gear 19 clockwise. Support member 2 is then pushed forwardly by the cranking action via drive arm 20 and driven pin 2c, and support member flange 2a abuts against stop 3 to increase the load, thereby stopping gears 15-20. When the supply of power to the motor continues, the motor torque and inertia are exerted on gear 14, so that gear 14 is moved so as to be disengaged from gear 15. Namely, gear 14 is displaced downwardly around pivot 12a. This causes lever 21 to turn counterclockwise around pivot 12a so that stop pin 21a enters click 22b and is locked by the spring force of tension spring 22c. At this time, the deviation of lever 21 is sensed by a switch or the like (not shown) to stop the power supply to the motor.

On the other hand, when support member 2 is displaced (housed) inwardly from the front of the camera body, the motor is reversed to rotate drive gear 19 counterclockwise. This causes drive arm 20 to pull driven pin 2c so that support member 2 is moved into the back of the camera body. At this time, lever 21 is turned clockwise around pivot 12a to disengage click 22b and hence stop arm 22 from stop pin 21a.

In this apparatus, however, support member 2 is held by the equilibrium between the magnitude of the reaction occurring when support member 2 abuts against stop 3 and the magnitude of the cogging torque of the motor. Therefore, holding support member 2 is unstable. A motor of a small cogging torque would be useless. The respective components must have high precision and be adjusted sophisticatedly.

What can be said in common concerning the above two conventional apparatuses is that when an external force is applied to support member 2 after same is positioned to a predetermined set position by the motor, a mechanical position hold means is used to prevent the motor from being reversed. Therefore, the structure of the apparatus is complicated and troublesome to adjust, and as a result the cost is high.

Embodiments of this invention will now be described with reference to FIGS. 1-12.

Figure 1:
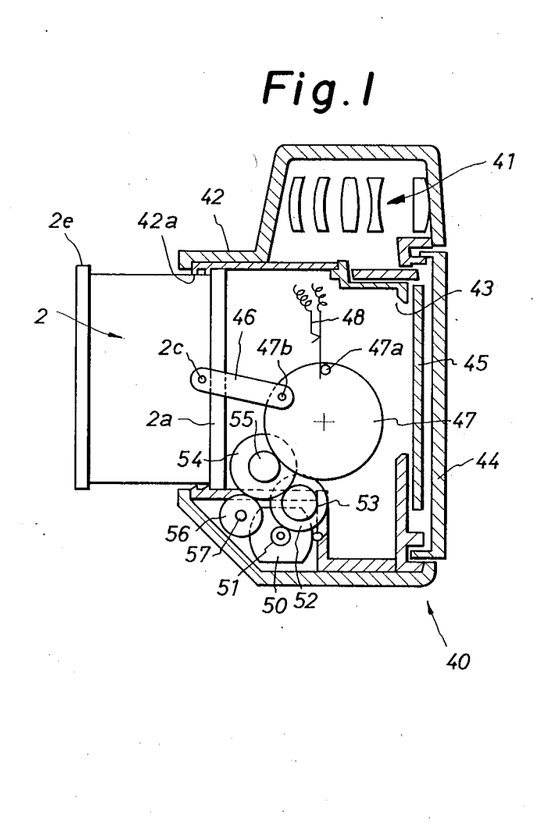
FIG. 1 is a side cross-sectional view of an embodiment of this invention, showing a forwardly extruded lens.
Figure 2:
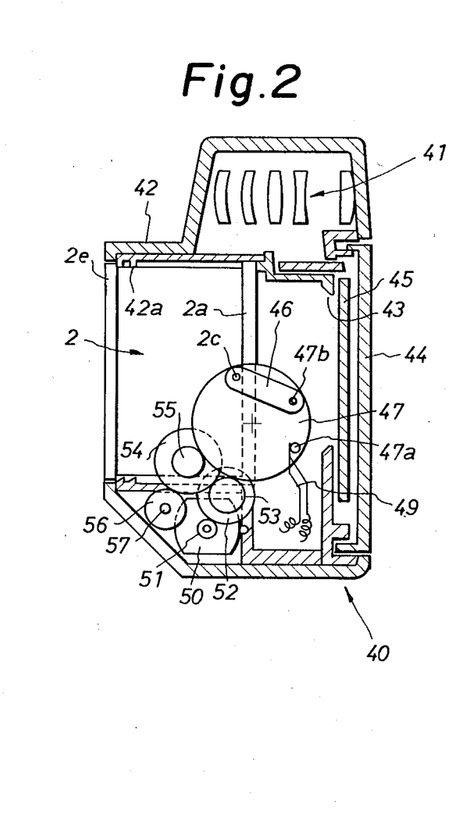
FIG. 2 is a side cross-sectional view of the embodiment, showing a retracted lens.

First, a first embodiment of this invention will be described with reference to FIGS. 1-6. This embodiment is an electric drive apparatus for a lens support member which is used to set a lens at a recessed position on the front of the camera when the camera is to be carried and at a position extruding from the front of the camera when a photo is to be taken. FIG. 1 shows the camera with the lens being set at a photo-taking position while FIG. 2 shows the camera with the lens being set at the position suitable for portage.

Figure 3:
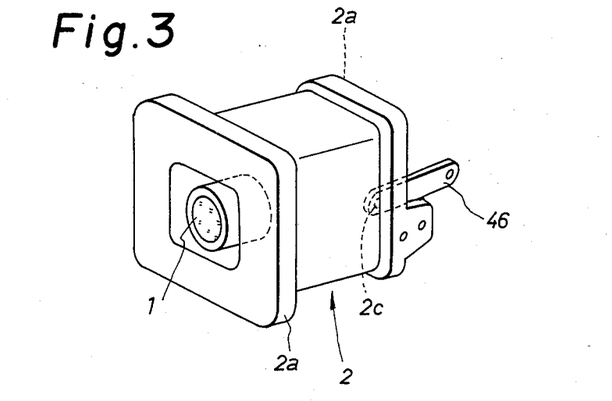
FIG. 3 is a perspective view of a support member shown in FIGS. 1 and 2.

A finder lens group 41 constituting an optical finder system is provided on top of the camera body 40 which has a substantially cylindrical guide 42 at the central front of the camera body. Support member 2, to be illustrated in more detail in FIG. 3, is disposed slidably within guide 42. A dirven pin 2c is fixed on each side of support member 2 (the right side drive pin 2c is not shown) and supports a drive arm 46. Support member 2 houses and supports lens 1.

Guide 42 has a stop 42a formed so as to provide a reduced diameter opening. When support flange 2a abuts at its left end surface against the right end surface of stop 42a, extrusion of support member 2 is restricted, while when support flange 2e abuts at its right end surface against the left end surface of stop 42a, the retraction of support member 2 into the housed (the so-called sink-into-body) position is restricted.

Drive arm 46 is supported at the other end by a drive pin 47b provided on the side of drive gear 47.

The camera body 40 has at its back a film exposure opening 43 with an openable back cover 44 on which a film push plate 45 is mounted.

Provided on the side of drive gear 47 is an operating pin 47a to actuate position detection switches 48, 49. Switch 48 is switched on when support member 2 is moved to the extruded position from the front of the camera body 40 where photo-taking is possible while switch 49 is switched on when support member 2 is retracted to the portage (rest) position in the camera body 40.

A motor 50 is disposed along the bottom of camera body 40. Motor 50 has an output shaft to which is coupled an output gear 51 which meshes with drive gear 47 through larger and smaller integral gears 52, 53, 54, 55 sequentially. Gear 54 meshes with a transmission gear 56 which has a fixed shaft 57 supported rotatable by camera body 40. Shaft 57 reaches the right side of camera body 40. It has a gear fixed to its other end, similar to gear 56 and coupled to a drive mechanism similar to the above drive mechanism and disposed at a position substantially symmetrical to the position of the above mechanism.

Figure 4:
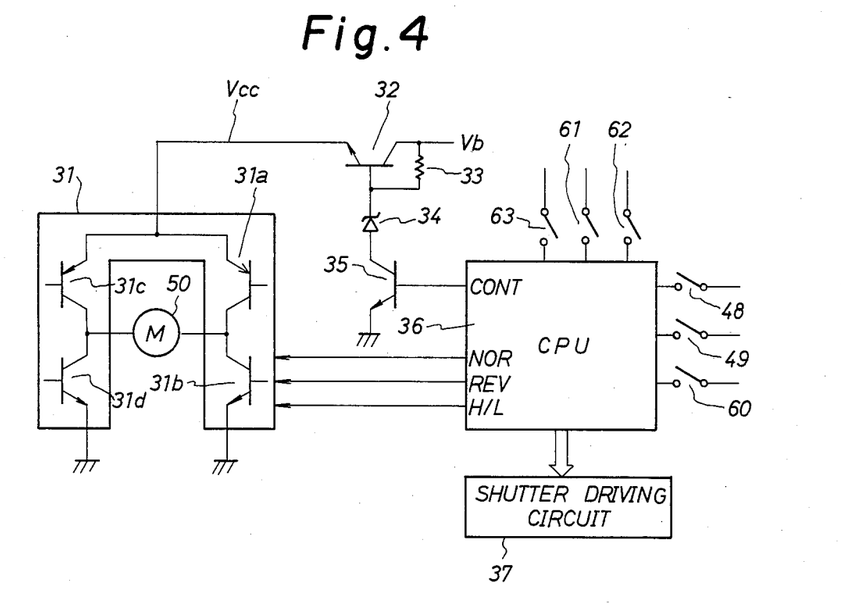
FIG. 4 is a circuit diagram showing one example of a power supply circuit for the motor shown in FIGS. 1 and 2.

A circuit as shown in FIG. 4 is connected to motor 50 in camera body 40 having the above structure. Both terminals of motor 50 are connected to the output terminals of a driving circuit 31 comprising an integrated circuit. Motor 50 is connected at one terminal in common to the collectors of PNP and NPN transistors 31a and 31b, and at the other terminal to the collectors of PNP and NPN transistors 31c and 31d. The respective emitters of transistors 31b,31d are grounded while the respective emitters of transistors 31a, 31c are connected together to an operating voltage Vcc which is obtained from a power source voltage Vb via a constant-voltage circuit which includes an NPN transistor 32, a resistor 33 and a zener diode 34. Connected to the constant-voltage circuit is an NPN transistor 35 in order to control motor 50 to the operating/non-operating condition. Transistor 35 is connected at its collector to the annode of zener diode 34, at its emitter grounded, and receives at its base a drive signal CONT from a CPU 36.

In order to control a shutter exposure time, etc., a shutter driving circuit 37 is provided which receives various control signals from CPU 36 which in turn receives a signal indicative of the completion of guide 2 extrusion from switch 48, a signal indicative of the completion of guide 2 retraction, a first release signal produced from a first release switch 61 when same is switched on by a half press of a shutter release button, and a second release signal produced from a second release switch 62 when same is switched on by a further press of the shutter release button. In addition, CPU 36 receives a signal from a main switch 60 which causes electric power to be supplied to the respective circuits in the camera so as to enable a photo operation. CPU 36 also receives a signal from a mode switch 63 which is manually switched on to extrude lens from the front of the camera body and switched off to retract lens.

Driving circuit 31 is supplied with three different control signals which are a forward rotation signal NOR, a reverse rotation signal REV, and a current setting signal H/L from CPU 36.

Figure 5:
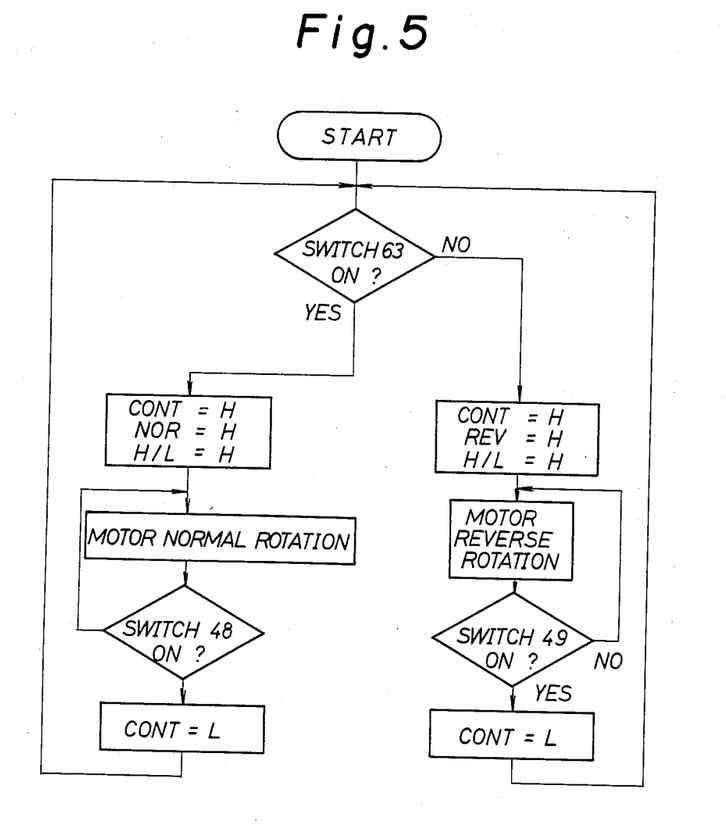
FIGS. 5 and 6 are flowcharts illustrating the operation of the circuit shown in FIG. 4.
Figure 6:
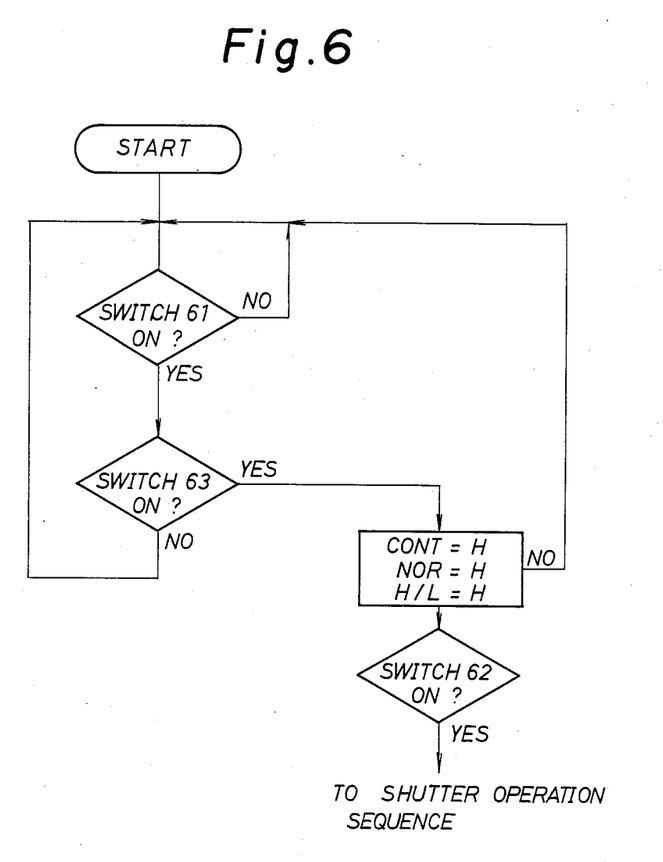

The operation of this embodiment, constructed thus, will be described using the flowcharts shown in FIGS. 5 and 6.

When main switch 60 is switched on before the photo-taking is performed, CPU 36 initializes the respective circuit portions of the camera. CPU 36 checks the on-off state of mode switch 63. When mode switch 63 is on, drive signal CONT, normal rotation signal NOR and current setting signal H/L are high in order to rotate motor 50 normally. The high drive signal CONT turns on transistor 35, the emitter output of transistor 32 is controlled by the constant voltage produced by zener diode 34, and the operating voltage Vcc is supplied to driving circuit 31. High normal rotation signal NOR turns on both of transistors 31c and 31b to rotate motor 50 normally. This causes the motor torque to be transmitted to output gear 51, gears 52-55 sequentially to rotate drive gear 47 counterclockwise, so that drive pin 47b pushes drive pin 2c via drive arm 46 outwardly from the front of the camera body. This extrusion continues until support flange 2a abuts against stop 42a of guide 42, at which time the switch 48 is actuated by operating pin 47a to be switched on.

A signal indicative of the switching on of switch 48 is detected by CPU 36 and drive signal CONT becomes low at which time transistor 35 is turned off to interrupt power supply to motor 50 to stop same.

On the other hand, when support member 2 is to be retracted into the camera body 40, switch 63 is switched off. This causes drive signal CONT, reverse rotation signal REV and current setting signal H/L to be at high level. This turnes on both of transistors 31a and 31d to reverse motor 50.

Therefore, in the manner reverse to the extrusion of the guide, support member 2 is retracted into the camera body 40. This operation continues until CPU 36 sets drive signal CONT low after detecting the closing of switch 49 caused by operating pin 47a.

After the extrusion of lens 1 is completed, and the shutter release button is half pressed to switch on switch 61, as mentioned above, the on state of this switch is detected by CPU 36. In this case if switch 63 is on, CPU 36 produces a high drive signal CONT, a high normal rotation signal NOR and a low current setting signal H/L, so that a slight or weak current lows through motor 50 and lens 1 is pushed in the direction of extrusion from the front of the camera body.

Therefore, when the shutter release button is further pressed, switch 62 is switched on. The on signal of switch 62 is input to CPU 36 to extrude lens 1 forwardly and stop same. Under this restriction of position the shutter driving circuit 37 receives various control signals to start an exposure operation by the shutter.

Figure 7:
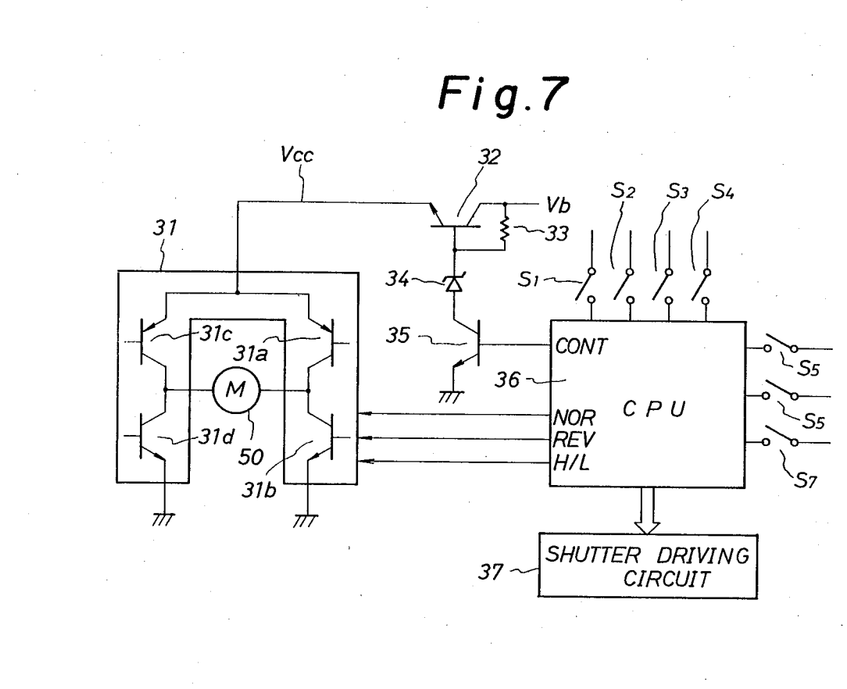
FIG. 7 is a circuit diagram showing another example of the power supply circuit for the motor.

If the above embodiment is for a camera in which lens 1 is driven by the motor to the longer focus side (telephoto side) and to the shorter focus side (wide angle side), the circuit connected to motor 50 has a structure such as that shown in FIG. 7.

In FIG. 7, CPU 36 receives signals produced by switches S1-S7. In more detail, switch S1 is turned on when a barrier provided before the lens is opened. Switch S2 is turned off in a telephoto mode and turned on in a wide angle mode. Switches S3, S4 have similar functions to first and second release switches 61, 62, as mentioned above.

Switches S5 and S6 are turned on when the lens has been moved to the telephoto and wide angle sides, respectively. Switch S7 is turned off when the barrier is completely closed.

Figure 8:
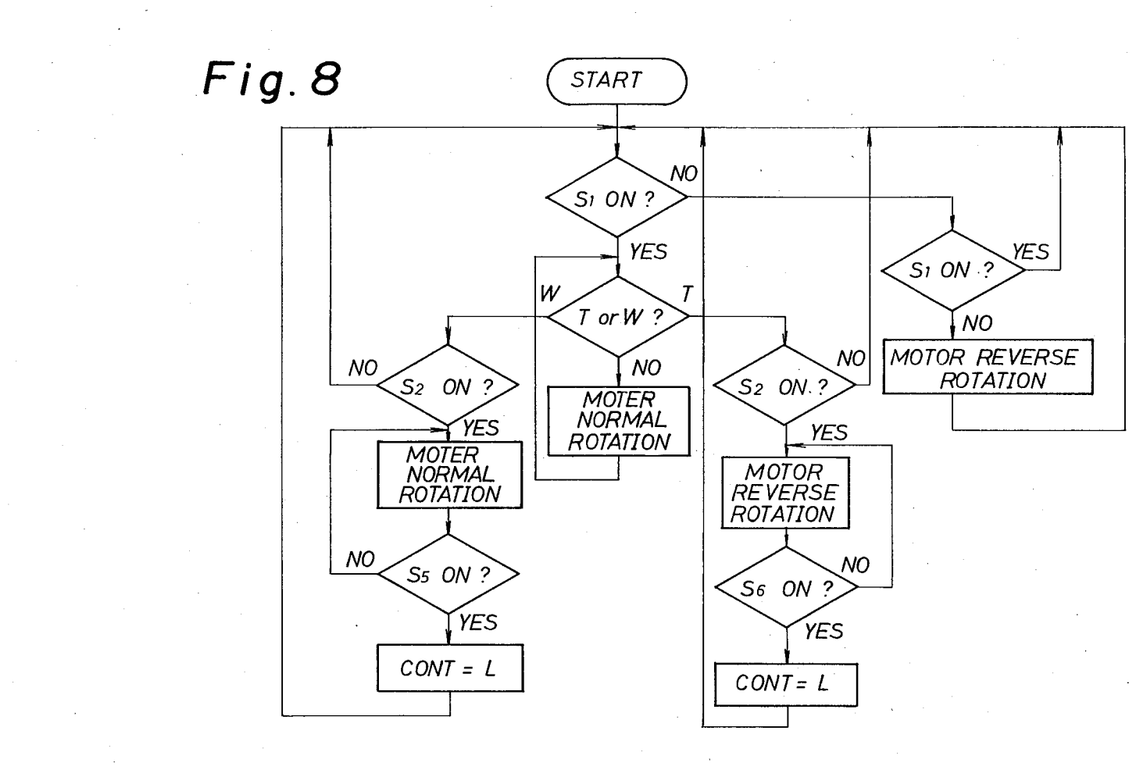
FIGS. 8 and 9 are flowcharts for illustrating the operation of the circuit shown in FIG. 7.
Figure 9:
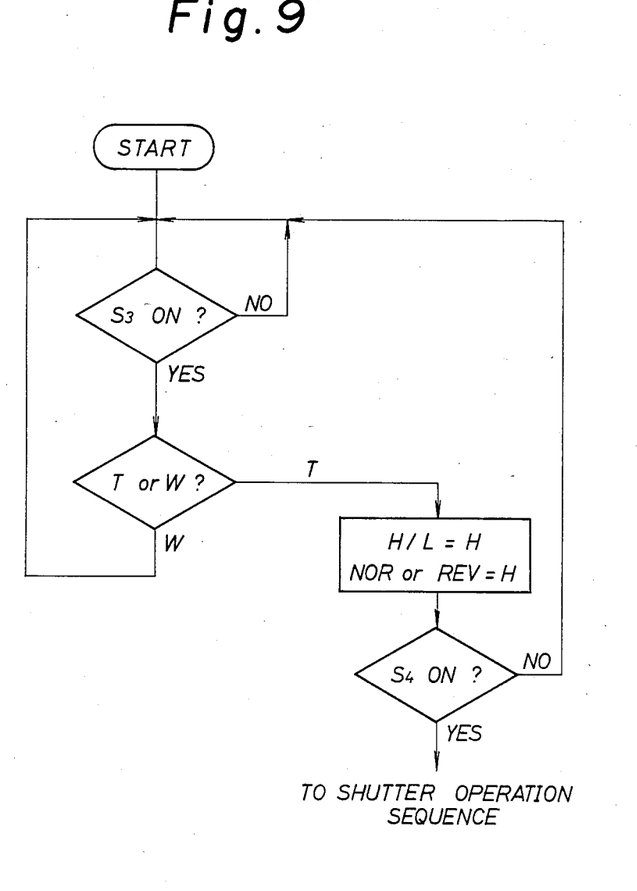

Thus the operation of the above arrangement is shown by the flowcharts in FIGS. 8 and 9.

When a main switch (not shown) is switched on, the respective portions of the circuit are initialized. CPU 36 checks the on-off state of switch S1. When switches S1 and S7 are both off, CPU 36 waits for the switching on of switch S1. On the other hand, switch S7 is not off, drive signal CONT, reverse rotation signal REV and current setting signal H/L are rendered high. Thus, as described above, motor 50 is reversed via driving circuit 31 to return to its initial position.

When switch S1 is on, CPU 36 determines whether or not the lens is in the telephoto mode or in the wide angle mode by detecting the on-off state of switch S2. When switch S2 is on, drive signal CONT, normal rotation signal NOR, and current setting signal H/L become high to drive motor 50 normally to the wide angle side in a manner similar to that mentioned above. This normal rotation of motor 50 continues until switch S5 is switched on, i.e., the driving of the lens to the wide angle side has been completed. When switch S5 is switched on, drive signal CONT becomes low simultaneoulsly to stop power supply to motor 50.

On the other hand, when switch S2 is off, drive signal CONT, reverse rotation signal REV, and current setting signal H/L become high to reverse motor 50 to the telephoto side as mentioned above. This reversal of motor 50 continues until switch S6 is switched on, i.e., the driving of the lens to the telephoto side has been completed. When switch S6 is switched on, drive signal CONT becomes low simultaneously to stop power supply to motor 50.

After the driving of the lens to the telephoto side or the wide angle side has been completed, and if the shutter release button is half pushed to turn on switch S3, a signal depending on the setting of the lens to the telephoto side or to the wide angle side will be output, as shown in the flowchart of FIG. 9. For example, when the lens is on the wide angle side, drive signal CONT and normal rotation signal NOR become high, and current setting signal H/L becomes low to supply a weak current to motor 50, thereby pressing the lens against the end of the wide angle side. In contrast, when the lens is on the telephoto side, drive signal CONT and reverse rotation signal REV become high, and current setting signal H/L becomes low to supply a weak current to the motor, thereby pressing the lens against the end of the telephoto side at a substantially constant pressure.

Thereafter, when the shutter release button is further pressed, switch S4 is turned on. A signal indicative of this on signal is input to CPU 36 which sends various control signals to a shutter driving circuit 37 to start the exposure operation by the shutter with the lens being pressed against one set position, as mentioned above.

A modification of the circuit shown in FIG. 4 will now be described using FIG. 10.

Figure 10:
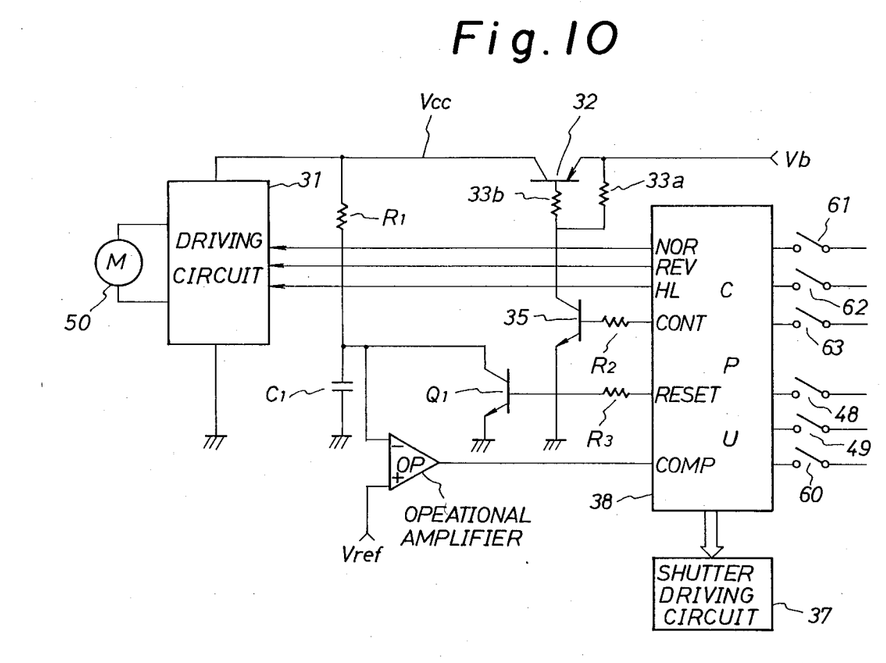
FIG. 10 is a circuit diagram showing a further example of a power supply circuit for the motor.

In FIG. 10, motor 50 is supplied with operating voltage Vcc via a driving circuit 31 similar to that mentioned above.

The operating voltage Vcc is supplied from a battery voltage Vb via the emitter-collector path of PNP transistor 32. A serial circuit of resistors 33a and 33b is connected across the emitter and base of transistor 32 and the junction point of resistors 33a and 33b is grounded via the collector-emitter path of an NPN transistor 35, the base of which is connected via a resistor R2 to the output of CPU 38 from which the motor drive signal CONT is sent.

The supply line for the operating voltage Vcc is grounded via an integration circuit comprising a serial circuit of a resistor R1 and a capacitor C1. The junction of resistor R1 and capacitor C1 is connected to the inverting input (−) of an operational amplifier OP forming a voltage comparator and the non-inverting input (+) of amplifier OP is supplied with a voltage Vref from a reference voltage source.

The junction of resistor R1 and capacitor C1 is grounded via the collector-emitter path of an NPN transistor Q1 for discharge of the charges stored in capacitor C1. The base of transistor Q1 is connected via resistor R3 to an output terminal of CPU 38 through which reset signal RESET is sent out. The output of amplifier OP is connected to a terminal of CPU 38 through which a judgment signal COMP is input.

Connected to CPU 38 are shutter driving circuit 37 similar to that mentioned above, first and second release switches 61, 62, switches 48, 49 which detect the set positions of support member 2, and main switch 60.

Figure 11:
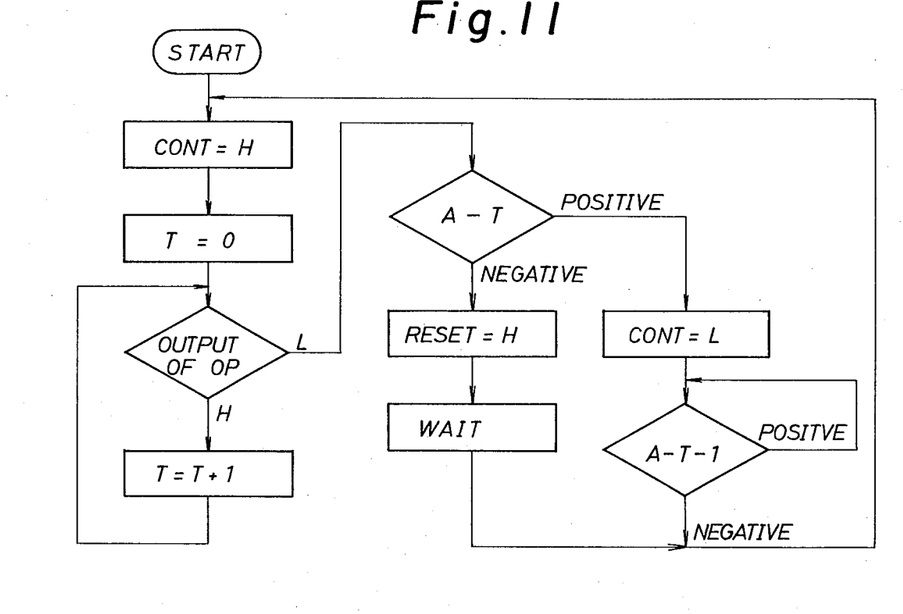
FIG. 11 is a flowchart for illustrating the operation of the circuit shown in FIG. 10.

In order to rotate motor 50 normally in the circuit constituted as just mentioned above, drive signal CONT, normal rotation signal NOR and current setting signal H/L are rendered high. Simultaneously, reset signal RESET is changed from high to low, transistor Q1 is turned off, capacitor C1 starts to be charged by voltage Vcc via resistor R1, so that the charging voltage across capacitor C1 rises grudually. At this time, the output of amplifier OP is at low level. The duration T of this low level is counted by CPU 38, and the sign of the difference between this time duration and a predetermined upper limit time duration A is sought. Thereafter, when the charging voltage exceeds the reference voltage Vref, the output of operational amplifier OP becomes high. At substantially the same time, drive signal CONT becomes low to turn off transistor 35 to interrupt power supply to motor 50. Simultaneously, reset signal RESET becomes high to turn on transistor Q1, thereby discharging the charges stored in capacitor C1. Thereafter, similarly, the charging and discharging of capacitor C1 are repeated. The period of this repetition is short when the battery voltage Vb is high and becomes longer as the voltage Vb becomes lower. The time when the output of operational amplifier Op becomes low is prolonged, i.e., the battery voltage Vb becomes lower, power supply to motor 50 is ensured by shortening sufficiently the duration when the drive signal CONT is low (drive signal CONT is not eventually rendered low).

On the other hand, when the lens is to be retracted into the camera body, reverse rotation signal REV is rendered highly, in a manner similar to that mentioned above, to reverse motor 50. As the battery voltabe Vb becomes lower, the time during which the current is supplied to motor 50 is rendered longer, so that the driving of motor is further ensured.

Figure 12:
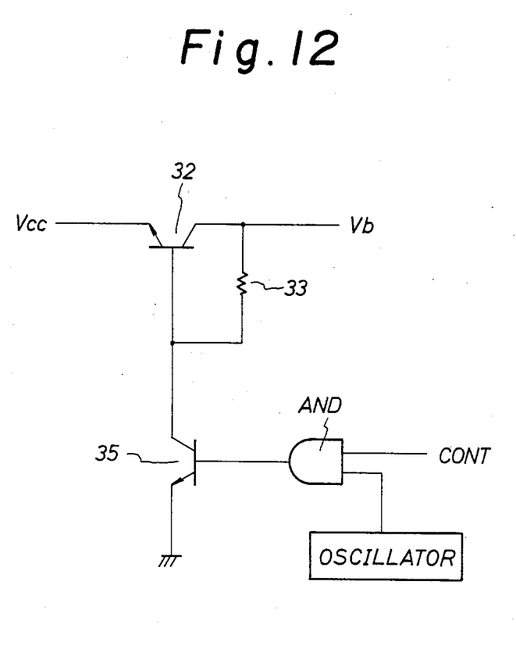
FIG. 12 is a circuit diagram showing another example of a switching circuit controlled by a drive signal.

Instead of transistor 35 being turned on or off by drive signal CONT from the CPU, the output of an oscillator OSC may be used to control transistor 35 via an AND gate AND, as shown in FIG. 12.

The processing of CPU 38 in accordance with the on-off operation of switches 60–63 and 48, 49 shown in FIG. 10 is similar to that in the above embodiment, and its description will be omitted.

It is to be noted that, of course, this invention is not limited to the above embodiments and many changes and modifications could be made by those skilled in the art without departing from the gist of the invention.

For example, a lens support member driven by the motor may be applicable not only to a camera of the so-called sink-into-body type in which the entire lens support member is driven, and a camera of the type in which part of the lens support member is driven to switch the telephotowide angle side, but also a camera of the type in which the lens is driven to a first set position and a second set position in regular photography and close-up photography, respectively.

The accurate control of the position of the lens by supplying a weak current to the motor can be performed from the time when the shutter release button is half pressed to the time when the shutter operation is completed, as shwon in the above respective embodiments. Alternatively, it may be performed continuously during the time when switches containing the main switch are on. The timing with which the supply of a weak current to the motor is stopped is quite optional. The point is that so long as a weak current is supplied to the motor during operation of the shutter, any timing may be used.

What is claimed is:

1. An apparatus for moving a lens between first and second positions, comprising; a support member means for supporting said lens, an electric motor connected to said support member means for moving said support member, a control circuit means connected to said motor for suppling a first current to said motor to move said support member means from said first position to said second position and vice versa and a second current to said motor to hold said support member means at least one of said first position and second position, said second current being smaller than said first current.

* * * * *